United States Patent [19]

Scheuer et al.

[11] 4,047,082
[45] Sept. 6, 1977

[54] VARIABLE THRESHOLD STARTING CIRCUIT FOR INDUCTION MOTOR

[75] Inventors: Paul R. Scheuer, West Lafayette; Karmen D. Cox, Lafayette, both of Ind.; Steven B. Sample, Lincoln, Nebr.

[73] Assignee: Design & Manufacturing Corporation, West Lafayette, Ind.

[21] Appl. No.: 610,124

[22] Filed: Sept. 4, 1975

[51] Int. Cl.² .................................................. H02P 1/44
[52] U.S. Cl. ..................................... 318/221 E; 318/227
[58] Field of Search ............... 318/221 R, 221 E, 227, 318/229

[56] References Cited

U.S. PATENT DOCUMENTS

| 3,740,631 | 6/1973 | Fricker et al. | 318/221 E |
| 3,761,792 | 9/1973 | Whitney et al. | 318/221 E |
| 3,777,232 | 12/1973 | Woods et al. | 318/221 E |

*Primary Examiner*—Gene Z. Rubinson
*Attorney, Agent, or Firm*—Melville, Strasser, Foster & Hoffman

[57] ABSTRACT

A circuit for the automatic starting of an induction motor of the type having a sensing means for producing a signal proportional to the main winding current and control means for allowing current flow through a start winding only when energized by a start winding control signal. The starting circuit includes means for continuously producing a variable threshold level which is proportional to a condition capable of affecting the current level in the main winding and which defines an adjustable threshold switching level. A comparison means continuously compares the adjustable threshold switching level to the signal proportional to the main winding current and, whenever the latter signal exceeds the former, the comparison means generates a start winding control signal which activates the start winding control means thereby establishing current flow through the start winding. When the main winding current decreases to a sufficient extent, the comparison means is characterized by the absence of a start winding control signal whereby the start winding control means will block the flow of current through the start winding.

11 Claims, 5 Drawing Figures

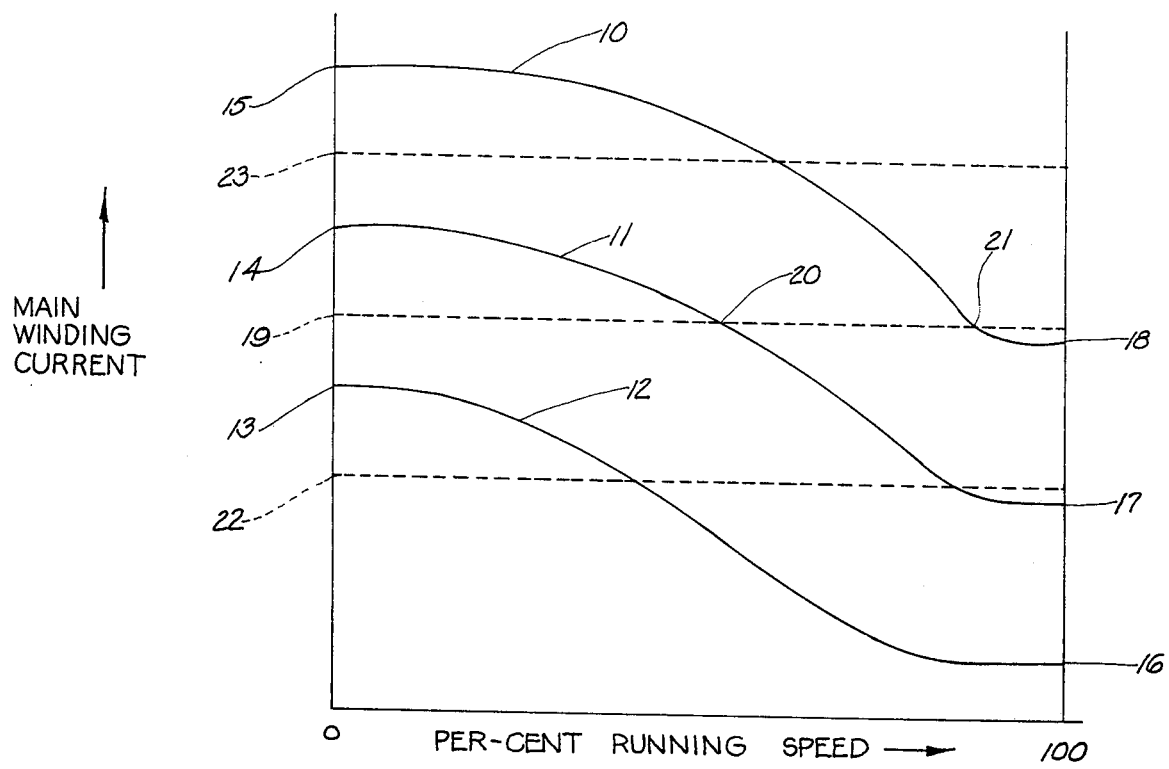
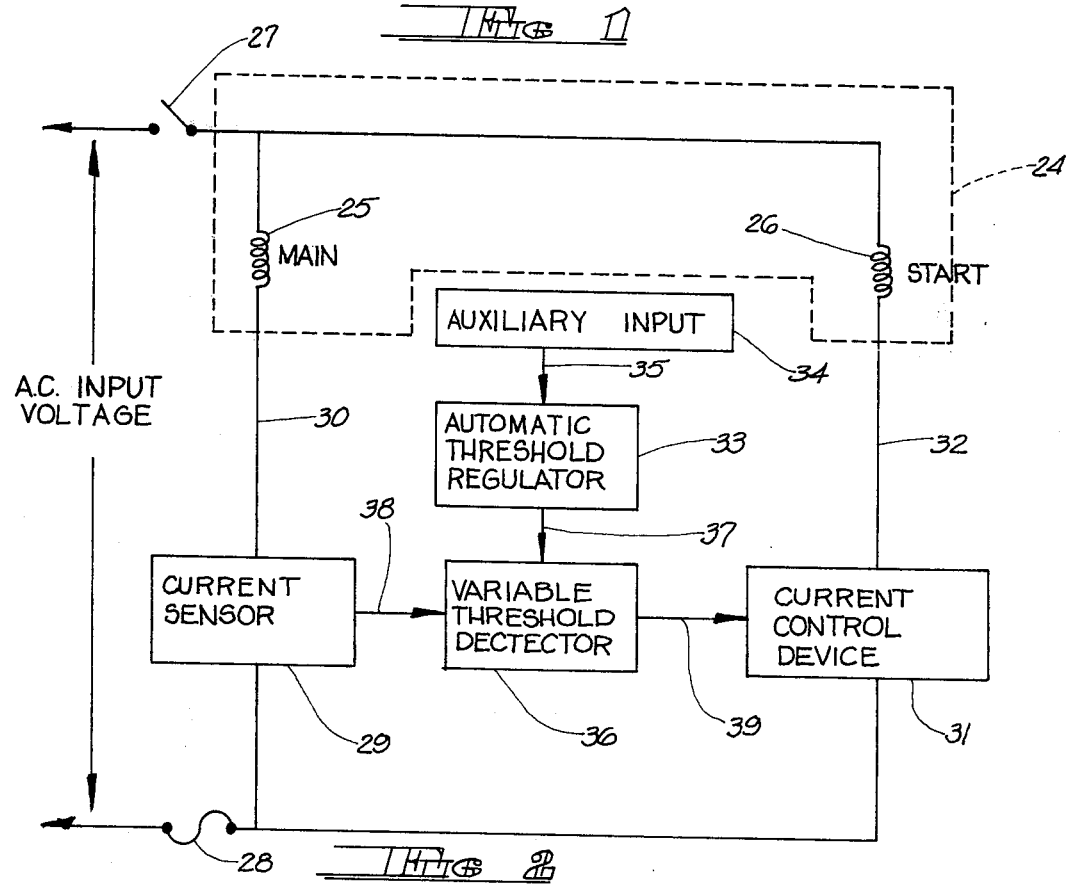

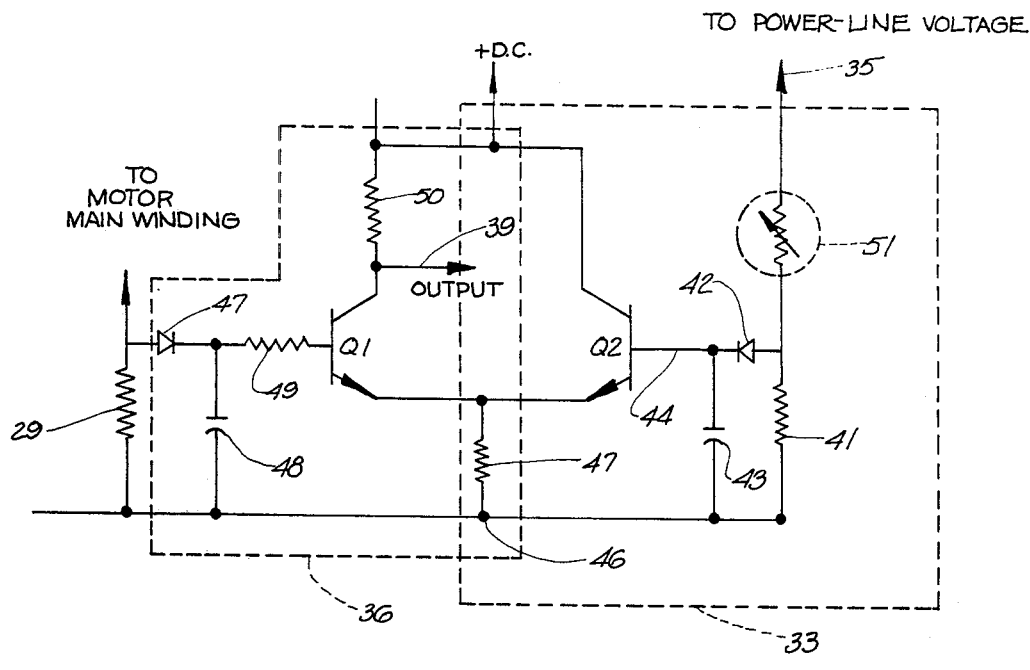

VARIABLE THRESHOLD STARTING CIRCUIT FOR INDUCTION MOTOR

BACKGROUND OF THE INVENTION

The present invention relates to an automatic starting circuit for a split-phase induction motor, and more particularly to an automatic starting circuit for a split-phase induction motor capable of compensating for variable external conditions which may affect the main winding current.

As is well known in the art, motors of the split-phase induction type commonly include at least two windings, a main or running winding used for economical running operation of the motor and at least one start winding used to momentarily assist the main winding in starting the motor. Often, two start winding are employed, one for starting the motor in a forward direction and the second for starting the motor in a direction reverse thereof. In order to insure proper motor operation and, to prevent damage to the start windings, switching means must be provided to automatically energize the start winding whenever the rotor speed is below a predetermined level and to de-energize the start winding when rotor speed exceeds this predetermined level.

The prior art discloses numerous techniques for accomplishing the aforementioned switching operation. For example, centrifugal switches, capable of responding to rotor speed, are well known in the art and have long been used to control the operation of the start windings. An approach of more recent vintage, of which U.S. Pat. No. 3,764,871 is exemplary, involves the use of solid state switching circuitry. This latter approach comprehends the use of means to sense the main winding current and breakover means adapted to energize a bi-directional thyristor connected in series with the start winding whenever the sensed main winding current exceeds a predetermined level. Subsequently, as the rotor speed increases and as the sensed main winding current falls below the break over level of the break over means, the bi-directional thyristor becomes deenergized, thereby preventing current flow through the start winding.

Prior art motor starting circuits, all of which are characterized by a fixed or predetermined threshold level at which start winding switching is accomplished, are inherently incapable of compensating for or responding to external conditions affecting motor operation. Thus, the prior art motor starting circuits are limited to applications where the conditions which affect motor operation are known to vary over a relatively narrow range. Commonly, the prior art starting circuits have required the establishment of a start winding switching threshold (i.e., a predetermined and fixed threshold) which is simultaneously below the minimum expected locked rotor current and above the maximum expected running current. These conditions insure that the start winding will always be initially energized when the main winding current is above the threshold level, and then deenergized as the motor reaches running speed. Although some minimal adaptability to motor sensitive conditions can be achieved by proper establishment of the start winding switching threshold, the prior art starting circuits nevertheless remain unable to compensate for large variations in motor sensitive conditions which frequently affect motor operation.

Conditions which affect the operation of induction motors and, more specifically, induction motor main winding current (thereby influencing the operation of current sensing type motor starting circuits) include variations in the locked rotor and running currents due to the temperature of the motor, variations in the locked rotor and running currents due to differences between individual motors, and variations in the locked rotor and running currents due to variations in the power-line voltage supplied to the motor. For example, a motor designed to operate from a 110 volt a.c. power-line may typically draw a locked rotor current of approximately 13 amperes and a running current of approximately 6 amperes. Under such circumstances, the fixed start-winding switching threshold of the prior art may typically be set at approximately 10 amperes. That is, for main winding currents in excess of 10 amperes the start winding will carry current, whereas, for main winding currents less than 10 amperes the start winding will be deenergized. Since a similar motor operating from a 90 volt a.c. power-line could draw a locked rotor current of only 9 amperes, it will readily be appreciated that, under this 20 volt power-line voltage deviation, the start winding will never be energized and, consequently, the motor will not become operational. Furthermore, if the 20 volt power-line voltage variation occurs in the other direction (i.e. where the a.c. power-line voltage is 130 volts), it will be readily appreciated that the start winding will be energized for an inordinate period of time possibly resulting in damage thereto.

The motor starting circuit of the present invention has, as its key element, the inherent ability to operate successfully over a wider range of varying conditions than the prior art circuits. This includes the ability to operate in cases where the main winding locked rotor current under one set of conditions is less than the main winding running current under another set of conditions.

SUMMARY OF THE INVENTION

It is an object of the present invention to provide a split-phase induction motor starting circuit capable of successful operation over a wide range of motor sensitive conditions.

More specifically, it is an object of the present invention to provide, in combination with a split-phase induction motor starting circuit of the type having a sensing means for producing a signal proportional to the main winding current and control means for allowing current flow through a start winding only in response to a start winding control signal, means for developing an adjustable threshold level proportional to a condition affecting the main winding current and means for continuously comparing the adjustable threshold level to the signal proportional to the main winding current. Whenever the signal proportional to the main winding current exceeds the adjustable threshold level, the comparison means generates the start winding control signal. And, when the main winding current decreases to a sufficient extent, the comparison means is characterized by the absence of the start winding control signal whereby the start winding control means will block the flow of current through the start winding.

In accordance with these and other useful objects an auxiliary input signal, providing a proportionate measure of one or more of the varying conditions which can affect motor operation, is fed to an automatic threshold regulator. The automatic threshold regulator sets the adjustable threshold level in response to the auxiliary input signal, and has the ability to compensate for changes in conditions which would give false indications of motor speed and main winding current.

A variable threshold detector receives inputs from a main winding current sensor and the automatic threshold regulator and, after comparison thereof, develops an output signal which operatively controls a start winding current control device.

In operation, the start winding switching threshold is automatically adjusted for the existing conditions so that when the motor is stopped or running at low speed, the output signal is such that the start winding is energized. When the motor reaches normal running speed, and the magnitude of the signal proportional to the main winding current falls below the automatically adjusted start winding switching threshold, the start winding is deenergized.

Since the start winding switching threshold is automatically adjusted upwards or downwards in proportion to the conditions which may affect motor speed and main winding current, the motor starting circuit of the present invention is substantially insensitive to changes in these conditions.

BRIEF DESCRIPTION OF THE DRAWINGS

FIG. 1 is a graph illustrating main winding current versus motor running speed for three levels of a motor sensitive condition.

FIG. 2 is a block diagram of the motor starting circuit of the present invention including the main and start windings of a split-phase induction motor.

FIG. 5 schematically illustrates another embodiment of the motor starting circuit of the present invention wherein the motor sensitive condition is the combined effect of both power-line voltage and motor temperature.

DESCRIPTION OF THE PREFERRED EMBODIMENTS

Figure 3:
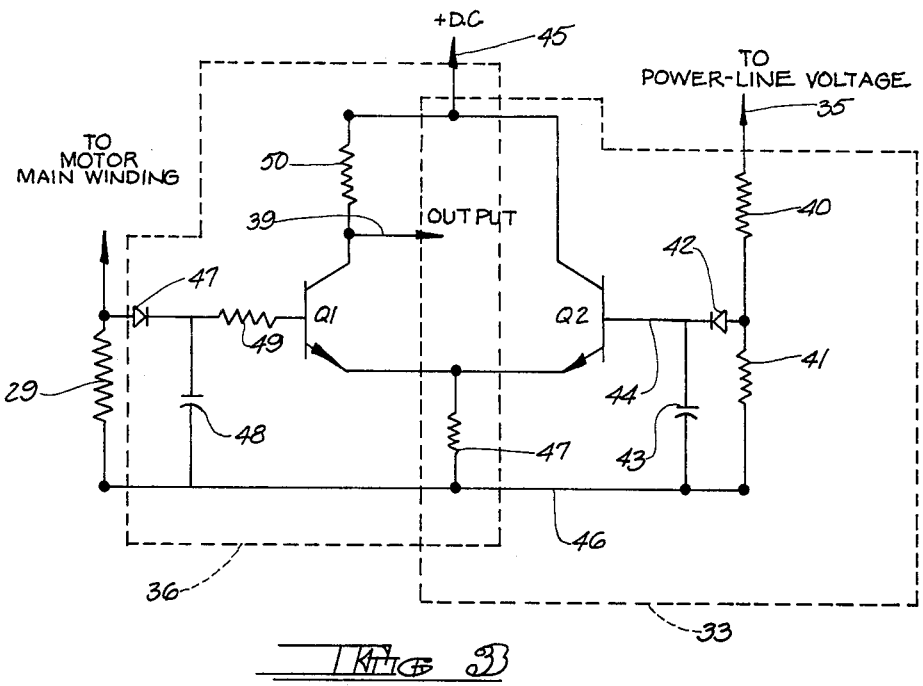
FIG. 3 schematically illustrates one embodiment of the starting circuit of the present invention wherein the motor sensitive condition is the power-line voltage.

Referring to the drawings, wherein like numerals identify corresponding components, FIG. 1 is a graph succinctly illustrating the deficiencies in the prior art motor starting circuits which the motor starting circuit of the present invention overcomes. The graph includes a family of curves 10, 11 and 12 which depict, for the same motor operating under similar conditions, motor main winding current versus percent of running speed for three levels of an external condition which may affect motor operation. Although the curves 10, 11 and 12 are generally applicable to any condition which may affect motor operation, such as the a.c. power-line voltage and the motor temperature, for purposes of clarity, the discussion herein will be predicated upon the curves representing three different levels of input a.c. voltage from which the motor main winding may be energized.

Accordingly, curve 11 may represent the operating characteristics of the motor when powered by a normally expected input voltage level (typically 110 volts), curve 10 may represent the operating characteristics of the motor when powered by an input voltage level greater than the normally expected level (e.g. 130 volts) and curve 12 may represent the operating characteristics of the motor when powered by an input voltage level less than the normally expected level (e.g. 90 volts). It will be noted that the locked rotor main winding currents 13, 14 and 15 increase as the input voltage level increases. Similarly, the main winding running currents 16, 17 and 18 increase as the input voltage increases.

As previously discussed herein, for proper operation of a split-phase induction motor, the start winding must be momentarily energized to facilitate motor starting, and subsequently deenergized as the motor reaches running speed. In accomplishing this result, the prior art motor starting circuits establish a predetermined and fixed start winding switching level in between the minimum expected locked rotor current and the maximum expected running current. Typically, the prior art motor starting circuit would establish this switching level at a main winding current level indicated at 19. Although this latter switching level will accommodate small variations in the a.c. power-line voltage without causing serious detrimental effects in motor operation, it is substantially incapable of producing proper motor operation under conditions of large variations in the a.c. power line voltage.

For example, it will be noted that at the low input power level associated with operating characteristic 12, the locked rotor current 13 never reaches the fixed switching level 19. Consequently, if the motor experiences this lower voltage level, the start winding will never be energized and the motor will remain inoperative.

An additional parameter of importance in establishing the start winding switching level is the length of time that energization of the start winding is to be maintained during motor start-up. For the normal voltage condition associated with operating characteristic 11, start winding switching occurs at point 20. Therefore, the start winding will be energized during the period of time that the motor speed and current are between points 14 and 20 and deenergized between points 20 and 17. However, in the case of the high input voltage condition associated with operating characteristic curve 10, start winding switching will not occur until point 21 is reached thereby exposing the start winding to potential damage.

In order to overcome these serious deficiencies in prior art motor starting circuits, the motor starting circuit of the present invention utilizes a variable start winding switching level which is at all times proportional to the magnitude of the motor sensitive condition. In other words, referring to the graph of FIG. 1, if the input voltage to the main winding is at a level indicated by curve 11, a start winding switching level of 19 will be established. Similarly, if the input voltage drops to a level indicated by curve 12, or increases to a level indicated by curve 10, the start winding switching level will automatically be adjusted to the levels indicated at 22 and 23 respectively. It will be understood that although only three specific operating conditions have been depicted in the graph of FIG. 1, there is, in actuality, a continuum of such conditions that may occur. As will be described in detail hereinafter, the starting circuit of the present invention comprehends the establishment of a unique switching level for every possible condition in this continuum. By providing this variable start winding switching level, it is clearly evident that the starting circuit of the present invention can operate successfully over a much wider range of motor sensitive conditions than the prior art starting circuits.

FIG. 2 is a block diagram showing the basic components of the starting circuit of the present invention. A split-phase induction motor is diagrammatically indicated by the broken line rectangle 24 and includes a main winding 25 and one start winding 26. The main winding 25 and the start winding 26 are operatively connected to the a.c. input voltage by means of the control switch 27. Also, current protection may be provided for the main winding 25 and the start winding 26 by a protective device such as a fuse or the like as indicated at 28. It will be understood that, although only one start winding 26 is shown the circuit could easily be modified to include a second start winding to comprehend rotor rotation in a direction opposite that imparted by start winding 26. It will also be understood that only those elements of the motor 24 necessary for an explanation of the operation of the motor starting circuit of the present invention have been shown.

Main winding 25 is connected in series with a current sensing means 29 by lead 30. Current sensing means comprehended by the current sensor 29 are well known in the art and may include resistive type sensors and current sensing transformers. The use of current sensors of these types are taught in U.S. Pat. No. 3,764,871 entitled STARTING CIRCUIT FOR INDUCTION MOTOR.

The start winding 26 is connected in series with a current control device 31 by lead 32. Current control means of the type comprehended by the current control device 31 are well known in the art and are adapted to permit current flow through the start winding 26 only in response to an appropriate input start winding control signal. Typically, the current control device 31 may include digital logic circuitry to properly condition the input start winding control signal and to select the direction of rotation in which the motor is to be started, as well as interface devices, such as triacs, to switch the relatively high start winding current. U.S. Pat. No. 3,764,871 teaches the use of various start winding current control means of this type.

An adjustable start winding switching threshold is established by the automatic threshold regulator 33 in conjunction with the auxiliary input 34 operatively connected thereto by line 35. As will be described in further detail hereinafter, a variable threshold detector 36 simultaneously receives the adjustable threshold signal from the automatic threshold regulator 33 over line 37 and a signal from the current sensor 29 via line 38 which is proportional to the current in the main winding 25. The variable threshold detector 36, in turn, provides control signals over line 39 to the current control device 31, the latter controlling the flow of current through the start winding 26. Whenever the instantaneous signal applied to the variable threshold detector 36 by the current sensor 29 (which represents a signal level proportional to the current flow in the main winding 25) exceeds the adjustable threshold level as established by the automatic threshold regulator 33, a start winding control signal will be transmitted by the variable threshold detector 36 over line 39 to the current control device 31 which establishes current flow through the start winding 26. Subsequently, as the motor increases speed and the signal proportional to main winding current decreases, the variable threshold detector 36 will deenergize the current control device 31 thereby preventing further current flow through the start winding 26.

The circuit of FIG. 3 shows one embodiment of the motor starting circuit shown generally in FIG. 2 wherein the motor sensitive condition is the a.c. power-line voltage used to energize the motor windings. It will be appreciated that the a.c. power-line voltage applied to the motor windings will have an effect on main winding current in that, as the input voltage increases the main winding current will increase by a proportional amount.

It will be seen that in the embodiment of FIG. 3 the auxiliary input 34 is the power-line voltage and is applied by lead 35 to the automatic threshold regulator 33. The automatic threshold regulator 33 includes a voltage divider, consisting of resistors 40 and 41, connected in parallel across the power-line voltage. A voltage peak detector consisting of a diode 42 and a capacitor 43 is connected in parallel with the resistor 41. The base of transistor Q2 is connected to the peak detector by lead 44. The collector of transistor Q2 is connected to a d.c. bias potential as at 45 and the emitter of the transistor Q2 is connected to a reference potential 46 by the emitter resistor 47. It will be understood that one of the output leads of the power-line voltage source will also be connected to the reference potential 46.

The variable threshold detector 36 includes a peak detecting means, consisting of a diode 47 and a capacitor 48, connected in parallel across the current sensor 29 which is shown as a resistance. The cathode of diode 47 is resistively connected to the base of transistor Q1 by resistor 49. Finally, the collector of transistor Q1 is connected to the d.c. bias potential as at 45 through the collector resistor 50 while the emitter of transistor Q1 is connected to the emitter resistor 47. It will also be noted that one terminal of the current sensing resistor 29 and one terminal of the detecting capacitors 43 and 48 are also connected to the reference potential 46.

Operation of the circuit of FIG. 3 is as follows. Current flowing through resistor 41 causes the latter to exhibit a voltage drop proportional to the instantaneous level of the input power-line voltage. The voltage drop across resistor 41 is peak detected by diode 42 and capacitor 43 whereby a positive d.c. bias potential is applied to the base-emitter junction of transistor Q2 whereby transistor Q2 will be conductive. Consequently, the emitter current of transistor Q2 will establish a d.c. voltage drop across the emitter resistor 47. It will be recognized that the emitter follower action of transistor Q2 will maintain the voltage drop across emitter resistor 47 at a level proportional to the input power-line voltage since, as the power-line voltage increases, the voltage across resistor 41 will proportionately increase causing transistor Q2 to conduct more heavily whereby its emitter current will increase and cause a corresponding increase in the voltage drop across emitter resistor 47. Similarly, as the power-line voltage decreases, the voltage across resistor 41 will decrease causing transistor Q2 to conduct less heavily thereby decreasing its emitter current and correspondingly decreasing the voltage drop across emitter resistor 47.

Referring to the variable threshold detector 36, it will be seen that the voltage drop across the current sensing resistor 29, which is proportional to the current flow in the main winding 25, is peak detected by diode 47 and capacitor 48. Thus, a d.c. voltage proportional to the main winding current will be applied through resistor 49 to the base of transistor Q1. Conduction of transistor Q1 will depend upon the d.c. signal appearing at its base exceeding the voltage drop across emitter resistor 47 by an amount equivalent to its base emitter junction forward bias potential. Accordingly, when the d.c. bias potential appearing at the base of transistor Q1 is of sufficient magnitude to overcome its base emitter junction forward bias potential and the reverse bias established at its emitter by the voltage drop across emitter resistor 47, transistor Q1 will conduct. And, when the base voltage at transistor Q1 is less than this amount, transistor Q1 will be non-conductive.

From the foregoing it is apparent that the adjustable start winding switching threshold comprises the voltage appearing across emitter resistor 47 due to transistor Q2 emitter current in conjunction with the base emitter junction forward bias potential of transistor Q1. Furthermore, it is readily apparent that when the current flow through the main winding 25 induces a voltage drop in the current sensing resistor 29, as peak detected and applied to the base of transistor Q1, in excess of the adjustable start winding switching threshold, transistor Q1 will be conductive and will produce an output signal at its collector substantially equivalent to the voltage drop across resistor 47. On the other hand, if the voltage drop across the current sensing resistor 29 is less than the variable start winding switching threshold, transistor Q1 will be non-conductive and the output at its collector will be substantially equivalent to the d.c. bias potential at 45. In other words, when the current in the main winding 25 is sufficiently high to cause the voltage drop across current sensing resistor 29 to exceed the adjustable start winding switching threshold (the voltage across resistor 47 as increased by the base emitter junction forward bias potential of transistor Q1), the collector of transistor Q1 will produce a logical 0 and, when the main winding current is less than the level sufficient to cause the voltage drop across sensing resistor 29 to overcome the adjustable start winding switching threshold, transistor Q1 will be non-conductive and will produce a logical 1 at its collector terminal.

It will, of course, be understood that the base emitter junction forward bias potential of transistor Q1 is a constant and somewhat nominal value (generally a few tenths of a volt) and will not appreciably affect the operation of the detector circuit 36 so that the control voltage across emitter resistor 47 in conjunction with the main winding current are the controlling factors in determining the state of transistor Q1.

The output 39 of transistor Q1 can now be used to control the current control device 31 which, in turn, controls the current flow through the start winding 26. It will be recognized that the output 39 of transistor Q1 will require inversion by the current control device 31 since its level is logical 0 when the start winding is to be energized and logical 1 when the start winding is to be deenergized.

Figure 4:
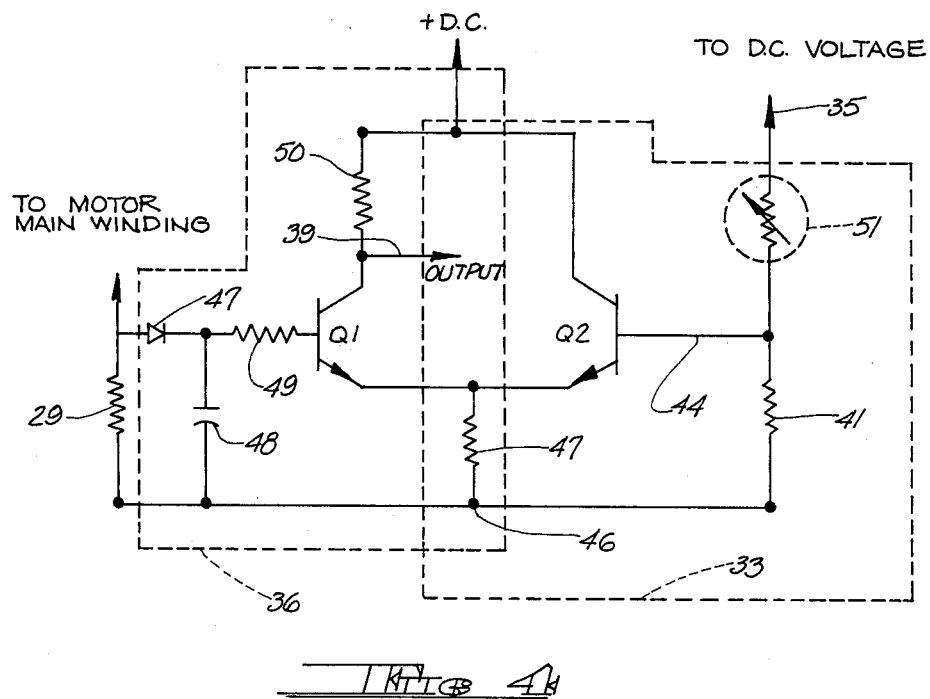
FIG. 4 schematically illustrates another embodiment of the starting circuit of the present invention wherein the motor sensitive condition is the motor temperature.

The embodiment shown in the circuit of FIG. 4 is substantially equivalent to the circuit of FIG. 3 except that the monitored condition is motor temperature instead of power-line voltage. In order to establish a voltage across the emitter resistor 47 that is a function of the temperature of the motor, a thermistor 51 replaces the resistor 40 of the FIG. 3 circuit configuration. Furthermore, since the automatic threshold regulator 33 is powered by d.c. voltage through lead 35, the peak detecting diode 42 and capacitor 43 may be omitted. Finally, since the thermistor 51 is to monitor motor temperature, it must be positioned in close proximity thereto.

It is well known that as motor temperature increases, the main winding current will tend to decrease. Accordingly, since an increase in temperature will increase the resistance of the thermistor 51, the voltage drop across thermistor 51 will increase while the voltage drop across resistor 41 will correspondingly decrease. In this manner, the d.c. potential applied to the base of transistor Q2 will decrease in proportion to the increase in temperature and the decrease in main winding current. Consequently, the emitter current of transistor Q2 will cause the control voltage (the voltage across emitter resistor 47) and the adjustable start winding switching threshold to be adjusted upwards or downwards in accordance with the motor temperature. The remainder of the circuitry of FIG. 4 operates identically to the FIG. 3 circuit and will therefore not be described in detail.

The circuit shown in FIG. 5 is a combination of the power-line voltage compensation circuit of FIG. 3 and the temperature compensation circuit of FIG. 4. Its operation is substantially identical to the operation of the power-line voltage compensation circuit of FIG. 3 except that resistor 40 has been replaced by thermistor 51. In this manner, the degree of conduction of transistor Q2 and the corresponding control voltage across emitter resistor 47 is controlled both by the motor temperature and the power-line voltage. As previously discussed, variations in power-line voltage will induce similar variations in the voltage across resistor 41 and variations in the motor temperature will cause similar variations in the resistance of the thermistor 51 which, in turn, will cause variations in the voltage drop across resistor 41 which are correspondingly opposite thereto. These variations in the voltage drop across resistor 41 are carried over by transistor Q2 and appear as variations in voltage across the emitter resistor 47 which establishes the start winding switching threshold level.

It will be understood that although only circuit embodiments which compensate for power-line voltage variations and motor temperature variations have been specifically shown, similar circuit arrangements for any other condition which may affect the main winding current are comprehended by this invention. Furthermore, although the present invention has been described in combination with a split-phase induction motor starting circuit, it is contemplated that it may also be applicable to starting circuits of other types of induction motors.

Modifications may be made in the invention without departing from the spirit of it.

The embodiments of the invention in which an exclusive property or privilege is claimed are defined as follows:

1. In combination with an induction motor starting circuit of the type having a sensing means for producing a first signal proportional to the main winding current, a current control means for allowing current flow through a start winding only when energized, and means for energizing said current control means when said first signal exceeds a threshold level, the improvement comprising:
   a. means for producing a second signal proportional to at least one condition affecting said main winding current; and
   b. means for adjusting said threshold level in accordance with the value of said second signal.

2. The improvement according to claim 1 wherein said current control means is energized only so long as a start winding control signal is applied thereto and wherein said adjustment means comprises means for comparing said first signal to said adjustable threshold level, said comparison means generating said start winding control signal whenever said first signal exceeds said adjustable threshold level.

3. The improvement according to claim 2 including first peak detecting means in association with said sensing means for converting said first signal to a corresponding d.c. level.

4. The improvement according to claim 3 wherein said comparison means comprises a first transistor, said first signal being applied to the base of said first transistor and said second signal being applied to the emitter of said first transistor, the voltage at said first transistor emitter defining said adjustable threshold level, said start winding control signal being developed at the collector of said first transistor.

5. The improvement according to claim 4 including a second transistor connected between said first transistor and said means for producing said second signal, said second signal being applied to the base of said second transistor and the emitter of said second transistor being joined in common with the emitter of said first transistor.

6. The improvement according to claim 5 wherein said means for producing said second signal includes second peak detecting means for converting said second signal to a corresponding d.c. level prior to said application thereof to said second transistor base.

7. The improvement according to claim 6 wherein said means for producing said second signal includes, in association with said second peak detecting means, a resistive voltage divider adapted to monitor the power-line voltage energizing said motor.

8. The improvement according to claim 5 wherein said means for producing said second signal includes means for producing a corresponding d.c. signal that is a function of said temperature of said motor.

9. The improvement according to claim 8 wherein said means for producing said d.c. signal as a function of the temperature of said motor comprises a d.c. energized voltage divider, said d.c. energized voltage divider including a thermistor for sensing the temperature of said motor and a first impedance, said d.c. signal as a function of the temperature of said motor comprising the voltage appearing across said first impedance.

10. The improvement according to claim 4 wherein said means for producing said second signal comprises a d.c. energized voltage divider, said d.c. energized voltage divider including a thermistor for sensing the temperature of said motor and a second impedance, said second signal comprising the voltage appearing said second impedance.

11. The improvement according to claim 7 wherein said resistive voltage divider includes a thermistor for sensing the temperature of said monitor and a resistor, said second signal comprising the voltage appearing across said resistor.

* * * * *